Sept. 2, 1958  E. G. SCHEIBEL  2,850,362
EXTRACTOR
Filed March 29, 1955  2 Sheets-Sheet 1
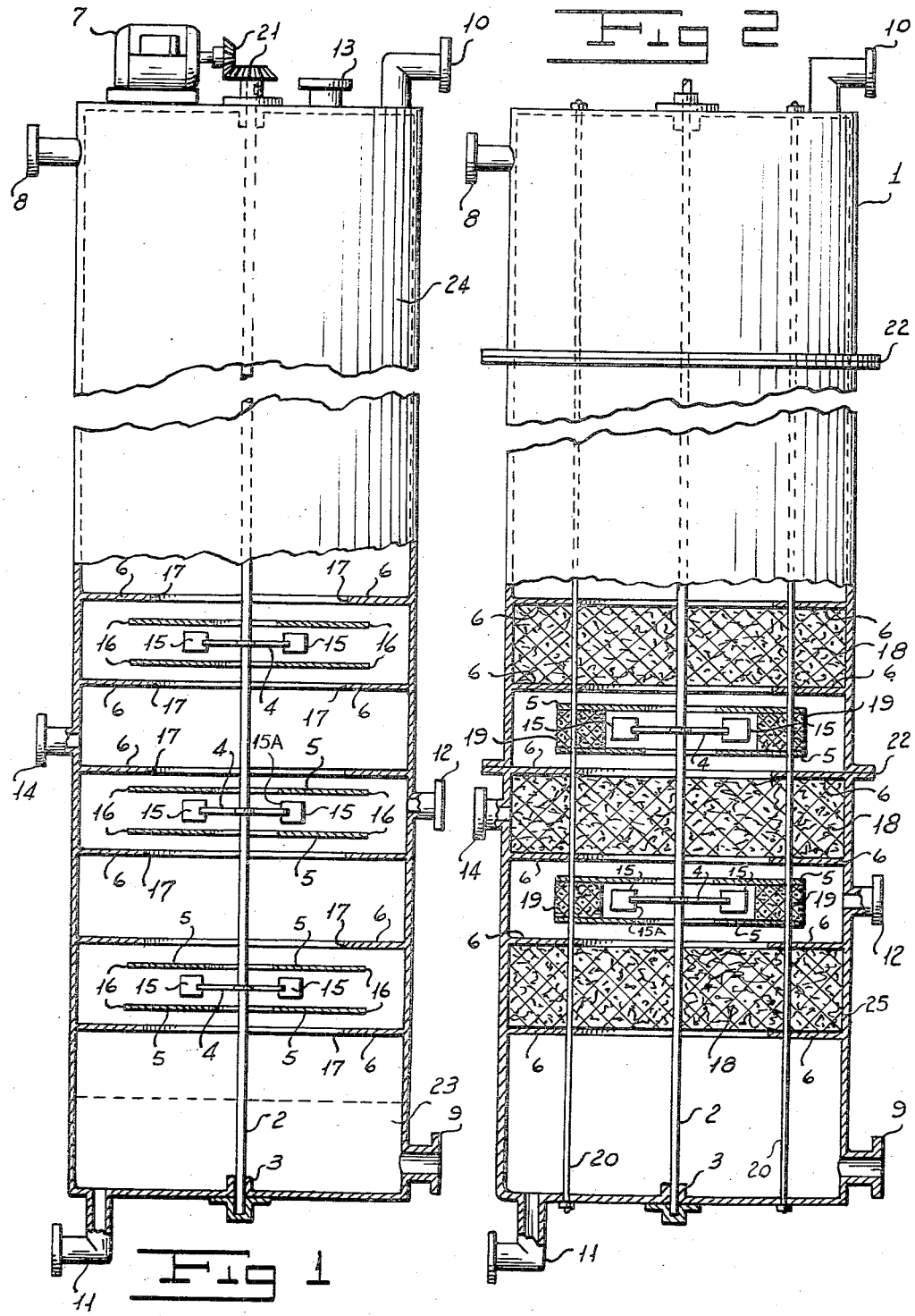

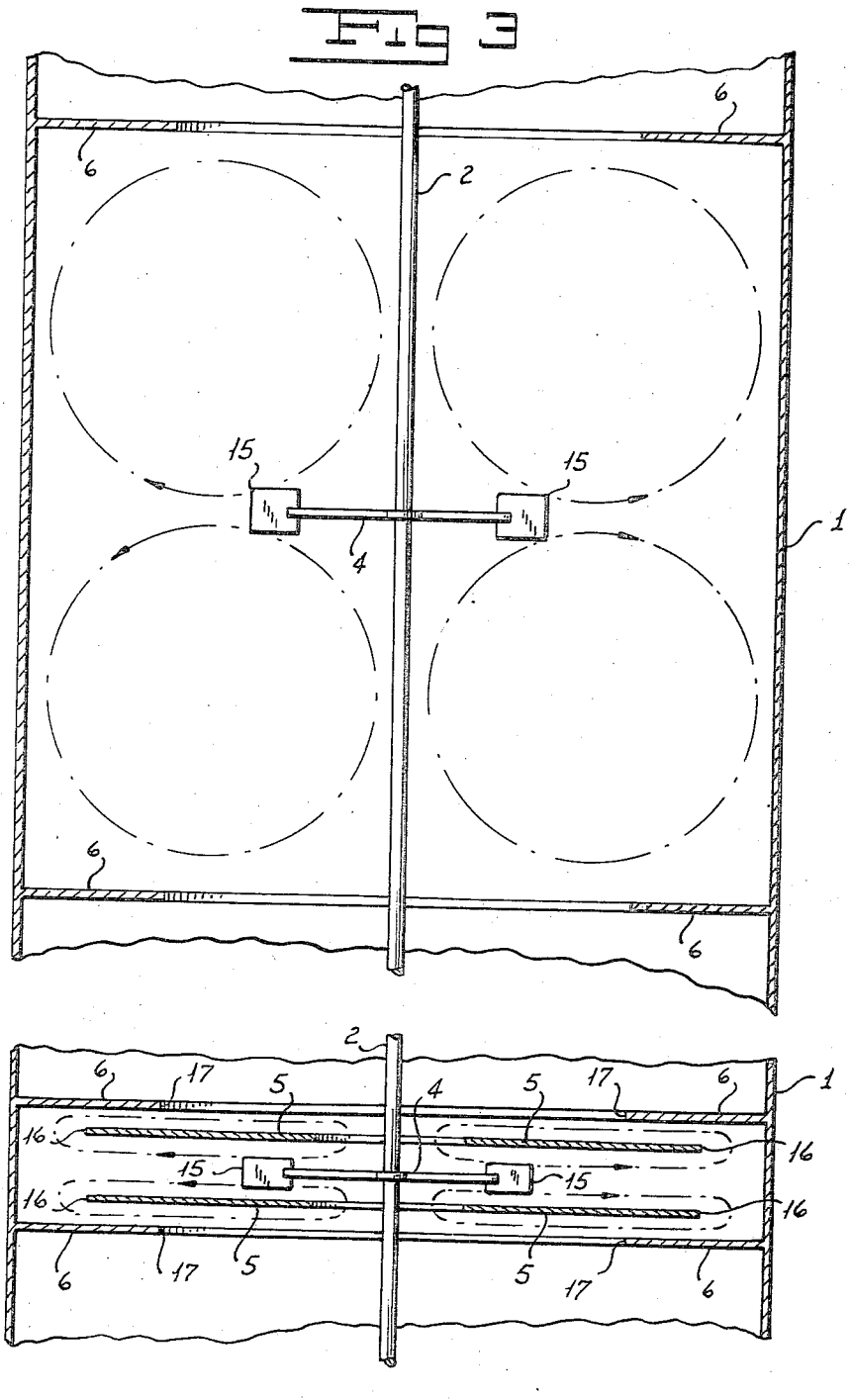

United States Patent Office 2,850,362
Patented Sept. 2, 1958

2,850,362

EXTRACTOR

Edward George Scheibel, Montclair, N. J., assignor to Hoffmann-La Roche Inc., Nutley, N. J., a corporation of New Jersey Application March 29, 1955, Serial No. 497,659

5 Claims. (Cl. 23—270.5)

This invention relates to an improved apparatus for countercurrent contacting of immiscible liquids. More particularly, the invention relates to an improved countercurrent solvent extraction column.

Multi-stage vertical columns or towers embodying high speed mixing devices are conventionally utilized in the extraction of liquid mixtures with one or more immiscible solvents. The extraction apparatus described in my prior Patent No. 2,493,265, issued January 3, 1950, is illustrative of columns of that type. In such extraction columns the height required for each theoretical or equilibrium stage increases as the diameter of the column becomes larger. Headroom requirements for columns of this design present problems, particularly in large diameter columns containing upward of ten stages.

It is an object of this invention to provide an improved and more efficient extraction apparaotus. It is also an object of this invention to provide an improved extractor which requires a minimum height for each theoretical stage, particularly in large diameter columns.

In the operation of the mixing sections of a countercurrent extraction column, each stirrer sets up a flow of liquid both above and below the agitator blades as depicted diagrammatically in cross section in Figure 3. Each flow pattern in a cylindrical column resembles generally a tube of circular or elliptical cross section. As the diameter of the column is increased and as the size of the agitator is increased to maintain mixing efficiency, the cross sectional area of each flow pattern also increases. The increase in the size of each flow pattern within each mixing section requires a corresponding increase in the height of the mixing section. The height of a mixing section is determined essentially by the height of these flow patterns. Separation between liquid phases must begin to occur as the liquids pass from one section to another.

In columns employing calming or quiescent sections between the mixing sections, the amount of turbulent liquid spilling over into the calming sections must be kept at a minmum. In the latter instance, the height of the mixing section may be reduced to less than the overall height of the normal flow pattern in order to conserve height, but excessive flow of turbulent liquid into the calming section raises the height requirements of the calming section. Some of the saving in height in the mixing section is thereby vitiated. The height of each calming section must also be increased as the diameter and capacity of the column is increased. For each increase in the diameter of the column, therefore, the increase in height requirements for both mixing and calming sections increases the height of each stage.

It has been found that such extractors may be improved and the height requirements may be substantially reduced without sacrificing efficiency by positioning a flat, annular plate above and below the blades or radial fins of the agitator in each mixing section. These annular plates, when properly positioned, control the flow patterns and change their contours. Each flow pattern is elongated and reduced considerably in height, as illustrated diagrammatically in Figure 4. Extractors exhibiting a flow pattern as shown in Figure 3 require a ratio of internal diameter of the column to height of mixing section at about 1:1. According to this invention, the ratio of internal diameter of column to height of mixing section may be increased to about 6:1 to 12:1 with good efficiency. That is, when this invention is utilized, a column of given diameter and number of stages may be constructed in 1/6 to 1/12 the conventional height. The flat, annular flow control plates act in conjunction with the section separation baffles secured to the inside walls of the column to effect efficient mixing with little spilling of the turbulent liquid into adjacent sections. Net flow of the countercurrent liquid through the column occurs smoothly. More efficient, multi-stage extraction columns over two feet in diameter may be constructed to give the same number of stages in a shorter column.

Under some circumstances, a net rotational flow of liquid occurs in the mixing section in addition to the circular pattern of flow described above. Where this rotational flow is not desired, stationary deflecting means may be positioned between the two annular flow control plates in each mixing section and spaced about their periphery. The stationary deflecting means may take the form of vertical baffles or vanes. The deflecting means may conveniently take the form of flat structural ribs supporting or lending structural rigidity to the annular flow control plates.

According to a further modification of the invention, a perforate material such as wire mesh or screening, annular in outline, may be positioned between the annular flow control plates. This arrangement provides more efficient mixing while at the same time also reducing the tendency for rotational flow of the liquid. For convenience, the perforate material and the vertical baffles discussed above are collectively referred to as stationary deflecting means.

The improved extraction apparatus is useful in countercurrent contacting of substantially immiscible liquids. A liquid mixture may be contacted with a single solvent for one or more components in that mixture. A liquid mixture may be contacted with two different immiscible solvents having preferential solubility for different components of the mixture. Two immiscible liquid mixtures may be contacted to achieve a difference in the composition of those mixtures by virtue of differential solubilities of various components in each of them. A net flow of liquid in the column is established by virtue of the difference in the specific gravities of the liquids.

In the accompanying drawings:

Figure 1 shows one embodiment of this invention in elevation and partly in cross section.

Figure 2 represents a second embodiment of this invention shown in elevation and partly in cross section illustrating the use of packing and tie rods.

Figure 3 represents diagrammatically the flow pattern of liquids in conventional mixing devices.

Figure 4 represents diagrammatically the flow pattern of liquids in columns constructed according to this invention.

Referring to Figure 1 which illustrates a preferred embodiment, column 1, shown in partial cross section, is a vertical cylindrical tower closed at top and bottom. Mounted centrally through the entire length of the extractor is a rotatable shaft 2 seated in bottom bearing 3. The shaft extends through a bearing in the top of the column for connection with a driving means 7. Mounted on the rotatable shaft, at spaced intervals, are horizontally extending stirrers or agitators 4. The stirrers are preferably turbine type agitators, i. e. vertical fins 15 mounted along the periphery of a rotatable horizontal plate. The number of fins on each agitator may vary. Two to eight, preferably four, agitator fins are conveniently used. The mixing fins or blades have no pitch so as to impart only horizontal flow to the liquid. Rotation of the agitators in each mixing section is effected by coupling the shaft 2 on which the agitators are mounted to a driving means such as motor 7 through a bevel gear 21.

The column 1 is preferably divided into alternate mixing and calming sections. Each pair of adjacent mixing and calming sections constitutes one stage. The number of mixing and calming sections depends primarily on the number of stages required for a particular system comprising a given liquid mixture and a given solvent or solvents. The column may contain as many stages as desired. Each section, whether a mixing or calming section, is separated from the adjacent section by a flat annular baffle 6 mounted against the inside wall of column 1. The baffles 6 separating the mixing and calming sections prevent liquid communication between sections in the area adjacent to the column walls and also reduce the spillover of turbulent liquid from the mixing sections into the adjacent calming sections. The outside diameter of each annular baffle is approximately the same as the inside diameter of the column. These annular baffles are mounted snugly against the interior wall of the column.

A flat, solid, imperforate annular flow control plate 5 is positioned above and below the agitator in each mixing section. The annular plates have a central opening to accommodate the rotating shaft 2 and are mounted in the central zone of the column. Sufficient clearance is maintained in the central opening and in the vicinity of the column wall so as to provide a free area for smooth flow of liquid around the plate in the manner illustrated in Figure 4. The annular baffles and annular plates may be installed on vertically extending tie rods not shown in Figure 1 but illustrated in Figure 2.

The column is equipped at top and bottom with liquid inlets 8 and 9, and liquid outlets 10 and 11, respectively. Additional liquid inlets or outlets such as 12 may be inserted at any intermediate point in the column, if desired. In addition, access ports such as 13 and 14 may also be inserted at appropriate points in the top or side walls of the column in any number desired. Sight glasses and liquid level gauges (not shown) may also be included in the structure.

Figure 2 illustrates an especially preferred modification of my invention. Structural elements similar to those shown in Figure 1 bear the same reference number in Figure 2. Tie rods 20 are shown as supporting means for baffles 6 and annular flow control plates 5. Calming section 25 contains a packing material 18. The packing material 18 comprises a self-supporting wire mesh screen extending vertically through the entire calming section 25. Packing 18 is shown in the form of a rolled, tubular knit wire mesh. Also illustrated in Figure 2 is a perforate packing material 19 which is placed between adjacent flow control plates 5. Packing 19 comprises a loose wire mesh which is annular in form and extends from the outside periphery of the annular plates 5 inwardly to form a central opening slightly larger than the area required for operation of the agitator. The annular packing 19 completely fills the space between the plates 5 within the area described. The column is constructed in sub-assembly units which are joined by flanges 22.

Figures 1 and 2 illustrate two preferred modifications of this invention. The invention, however, is not restricted to the particular combination of structural features illustrated in each of the figures. For example, the use of packing material is optional in both the calming and mixing sections and the use of packing material in either of these sections does not require its use in the other section. Similarly, unit construction or sub-assembly construction is not restricted to the modifications shown in Figures 1 and 2, respectively.

Certain other alternative structures may be used in extraction columns of this invention. Turbine type agitators are preferred as described above. Alternatively, the stirrers may comprise flat, vertical blades extending radially from the shaft into the mixing sections. As a further alternative, the stirrers may take the form of square or rectangular fins mounted vertically on radially extending rods. The annular baffles 6 may be tightly mounted against the interior walls of the column either by bolting or welding to the interior column wall, by bolting to a supporting flange or angle extending from the column wall or by some equivalent means instead of or in addition to being supported on tie rods. A gasket is preferably employed to effect a tight seal. The flat, annular baffles 6 and annular flow control plates 5 may be constructed in one piece or in segments, as desired.

The structural members supporting the annular plates and baffles should be minimal with respect to size and number consonant with sound engineering requirements.

Any number of stages, each consisting of a mixing and calming section, may be installed in a tower, depending on the requirement for efficient extraction of a particular mixture and the solvents to be used. The requisite number of stages may be built in a single unit or the column may be constructed from sub-assembly units each comprising one or more stages. Preferably, large diameter columns are constructed as a single unit and the internal structure is assembled through access ports provided at intervals in the column wall. When sub-assembly units are employed they may be coupled by welding or bolting together flanges or angles mounted on the exterior of each sub-assembly unit. The rotating shaft on which the agitators are mounted may similarly be constructed in either one piece or in sections which are coupled together. Driving means for shaft 2 may be a pulley and belt or other equivalent means instead of motor 7 and gears 21. For purposes of illustrating both methods of construction, Figure 1 shows the single unit structure and Figure 2 shows a structure made up from sub-assembly units.

If desired, the calming sections may be fitted with packing material such as steel wool, wire mesh, etc. as described in my prior Patent No. 2,493,265 and illustrated in Figure 2. The packing stops the motion of the liquids and aids them in separating quickly. Preferably, packing of the self-supporting type, for example a roll of tubular knitted wire mesh, is employed. Fibrous material such as steel wool may also be used by including supports such as spiders (not shown) in the calming sections.

Additional settling sections 23 and 24 may be provided, if desired, as illustrated in Figure 1.

Rotational flow of liquid which occurs under some conditions in the mixing sections may be avoided by introducing vertical stationary baffles or vanes at spaced intervals between the adjacent annular flow control plates. Preferably, the rotational flow is minimized or eliminated by placing a perforate material in the space between the flow control plates. In this manner, more efficient mixing is simultaneously achieved. The perforate material may include wire screening or a packing material such as steel wool or wire mesh. The perforate material is also annular in shape and is mounted flush with the outside edge of the plates 5. It is equal in height to the distance between the two adjacent plates. The perforate material may vary in thickness from that of a wire screen positioned along the outside periphery of the space between the two annular plates to an annular packing extending from the outside periphery of the plates interiorly toward the central opening providing only minimal clearance for operation of the agitators.

The annular packing may be self-supported and rest on the lower annular plate in the respective mixing sections or may be mounted on supports such as a spider.

The relative dimensions of various structural features of this invention are limited to certain ranges and are determined as follows. The height of the mixing section is determined by the approximate height of the turbulent liquid in that section. The height of the turbulent liquid in turn is controlled by the two flat annular flow control plates 5 in each mixing section. The central openings of the plates 5 accommodate the rotating shaft 2 and are otherwise proportioned so that a smooth flow of liquid is set up around the plates, in the pattern illustrated in Figure 4. This depends in part upon the agitators. Preferably, turbine type or fin type agitators are employed in the column. The overall, outside diameter of the agitator is preferably about ⅓ to ½ the inside diameter of the column. The central opening of the flow control plate is slightly smaller than the distance between the interior edges 15A of opposing agitator blades, or, stated differently, the radius of the central opening of the annular flow control plate is slightly less than the distance from the center line of the shaft to the inside edge of the agitator blade or fin. In this manner, a pumping action is achieved by the rotating agitator. When blade type agitators are employed, the diameter of the central opening of the annular flow control plate is substantially smaller than the outside diameter of the circle described by the agitator.

The outside diameter of the annular plate may vary within certain limits. The outside edge 16 of the plate 5 is elongated to the extent necessary to achieve a smooth flow of liquid clear to the interior wall of the column without impingement of the circulating liquid on the wall of the column so as to create turbulence. In all cases, the outside edge 16 of the annular plate overlaps the interior edge 17 of the adjacent stationary baffle 6. That is to say, the outside diameter of annular flow control plate 5 must be larger than the diameter of the central passageway of annular baffle 6.

The central opening in stationary baffle 6 is proportioned so as not to interfere with the net flow of liquids through the column. Preferably the central opening in baffle 6 has a diameter approximately ⅔ the inside diameter of the column. When the annular flow control plates are used according to this invention the ratio of the inside diameter of the column to the height of each mixing zone may vary from about 6:1 to about 12:1.

Plates 5 preferably all have the same dimensions. Baffles 6 are similarly alike in dimensions. Plates 5 and baffles 6 need only be of sufficient thickness for structural adequacy.

The plane in which the annular plates 5 are suspended may vary within a limited range. The annular plate may be suspended close to the agitator blades so as to provide only minimal clearance for operation of the agitators. As an outside limit with respect to the distance from the horizontal center line of the agitator, the annular flow control plate 5 may be mounted in a plane equidistant between the horizontal center line of the agitator and the center line of the plane in which the adjacent annular baffle lies. Preferably, when no perforate material is employed between the annular plates, as shown in Figure 1, the plates are positioned in a plane midway between the plane of the adjacent stationary baffles and the plane of rotation of the agitator. Alternatively, when perforate material is used between the plates, they are positioned as close to the rotating agitator as possible, leaving only minimal clearance between plate and agitator blade so as to provide maximal pumping action.

The height of each calming section depends upon the physical properties of the liquids in the system. When there is a marked difference in the specific gravities of the respective liquids, they separate readily for a given degree of dispersion and a small calming section is required. Similarly, when there is low interfacial tension, the liquids separate readily for a given degree of dispersion, and a small calming section is required. Conversely, when there is a small difference in specific gravities of the liquids and also there is a high interfacial tension, the height requirements for the calming section are increased. A calming section equal in height to the height of the mixing section is adequate in the majority of systems. However, under some conditions of high specific gravity difference and low interfacial tension, the requirements for the calming sections are so low that no appreciable difference in the performance of the column is encountered if the calming sections are entirely eliminated.

The columns shown in Figures 1 and 2 operate in the same manner. A liquid mixture to be separated into its components is introduced into column 1 through inlet 12. A heavy solvent for one or more of the components of the mixture is introduced into the top of the column through inlet 8. A light solvent for one or more additional components of the mixture and substantially immiscible with the heavy solvent, is admitted into the bottom of the column through inlet 9. By virtue of the difference in their specific gravities, there is a net flow of heavy solvent toward the bottom of the extractor and a net flow of light solvent toward the top of the extractor. In each mixing section the counter-currently flowing light and heavy liquids are intimately admixed by the action of the agitators. The flow pattern indicated in Figure 4 is rapidly and smoothly set up and an intimate contact approaching the equilibrium state is quickly and efficiently effected between the liquids particularly when packing is used between the annular plates.

Due to the difference in specific gravities of the solvents, there is a net flow of heavy liquid downward through the column and of light liquid upward through the column. Liquids passing from the mixing sections into the adjacent calming sections cease their circular flow and separate, aided particularly by packing material in the calming sections. This alternate mixing and calming of the liquids continues throughout all the stages in the tower. Heavy liquid is withdrawn through outlet 11 and light liquid is withdrawn through outlet 10. A continuous operation is achieved by continuously introducing and withdrawing the liquids at the inlets and outlets at the appropriate rates.

I claim:

1. A solvent extraction apparatus comprising a vertically elongated column divided into a plurality of separate sections by flat, annular, horizontal baffles positioned at spaced intervals along the interior wall of the column, said baffles separating the column into sections communicating through the central openings in said baffles, said sections comprising alternate mixing and calming sections, a centrally located, rotatable shaft extending vertically through the column, vertical blade agitators mounted on said shaft and extending radially into each mixing section, a flat, annular flow control plate horizontally positioned in spaced relationship above and below each agitator not farther from the agitator than the midpoint between the horizontal center lines of the agitator and adjacent baffle, each of said annular flow control plates being centrally located within the column, having an outside diameter substantially less than the inside diameter of the column and directing the smooth flow of liquid through its central opening and around its sides substantially to the column wall, the diameter of the central openings of the annular flow control plates being smaller than the outside diameter of the agitator and the outside diameter of the flow control plates being greater than the diameter of the central openings in said flat, annular baffles, packing means in each calming section, stationary deflecting means positioned between the annular flow control plates, means for introducing liquid into the column, means for withdrawing liquid from the column and driving means for rotating said shaft.

2. A solvent extraction apparatus as in claim 1, wherein the ratio of inside diameter of the column to height of mixing section is about 6:1 to about 12:1.

3. A solvent extraction apparatus as in claim 1, wherein the agitator means is a turbine type agitator.

4. A solvent extraction apparatus as in claim 3, wherein the stationary deflecting means is a wire mesh and the annular flow control plates are positioned above and below the agitator with minimal clearance between each plate and agitator blade.

5. A solvent extraction apparatus comprising a vertically elongated cylindrical column, flat, annular baffles positioned horizontally at spaced intervals along the interior wall of said column, said baffles separating the column into a plurality of separate sections and permitting communication between sections only through their central openings, a centrally located, rotatable shaft extending vertically throughout the column, vertical blade, turbine type agitators extending radially from said shaft into mixing sections, the ratio of the inside diameter of the column to the height of a mixing section being about 6:1 to about 12:1, a flat, annular flow control plate horizontally positioned in spaced relationship above and below each agitator at a distance from the agitator not greater than ½ the distance between the horizontal center lines of said agitator and adjacent baffle, each of said annular flow control plates being centrally located within the column, having an outside diameter less than the inside diameter of the column and directing the smooth flow of the liquid through its central opening and around its sides substantially to the interior column wall, the diameter of the central openings in said flat annular baffles being approximately ⅔ the inside diameter of the column and less than the outside diameter of the flow control plates, the outside diameter of said agitators being ⅓ to ½ the inside diameter of the column and greater than the diameter of the central opening in said annular flow control plates, stationary deflecting means positioned between said annular flow control plates, means for introducing liquid into the column, means for withdrawing liquid from the column and driving means for rotating said shaft.

References Cited in the file of this patent

UNITED STATES PATENTS

| | | |
|---|---|---|
| 2,063,789 | Burk | Dec. 8, 1936 |
| 2,072,382 | Robinson | Mar. 2, 1937 |
| 2,091,645 | McConnell | Aug. 31, 1937 |
| 2,665,196 | Poffenberger | Jan. 5, 1954 |
| 2,729,545 | Reman et al. | Jan. 3, 1956 |